US010002518B1

(12) United States Patent
Wheeler et al.

(10) Patent No.: US 10,002,518 B1
(45) Date of Patent: Jun. 19, 2018

(54) SYSTEM AND METHOD OF BIOLOGICAL AND GERM CROSS CONTAMINATION CONTROL

(71) Applicants: Jay Wheeler, Tulsa, OK (US); Anthony Carson, Tulsa, OK (US)

(72) Inventors: Jay Wheeler, Tulsa, OK (US); Anthony Carson, Tulsa, OK (US)

(73) Assignee: OND Creative Solutions, LLC, Tulsa, OK (US)

( * ) Notice: Subject to any disclaimer, the term of this patent is extended or adjusted under 35 U.S.C. 154(b) by 18 days.

(21) Appl. No.: 15/438,493

(22) Filed: Feb. 21, 2017

Related U.S. Application Data

(60) Provisional application No. 62/389,113, filed on Feb. 18, 2016.

(51) Int. Cl.
*G08B 23/00* (2006.01)
*G08B 21/24* (2006.01)
*G08B 5/22* (2006.01)
*H04L 12/10* (2006.01)

(52) U.S. Cl.
CPC ........... *G08B 21/245* (2013.01); *G08B 5/223* (2013.01); *H04L 12/10* (2013.01)

(58) Field of Classification Search
CPC ........ G08B 21/245; G08B 5/223; H04L 12/10
See application file for complete search history.

(56) References Cited

U.S. PATENT DOCUMENTS

| | | | |
|---|---|---|---|
| 4,706,493 A | 11/1987 | Chang et al. | |
| 4,952,928 A | 8/1990 | Carroll et al. | |
| 5,202,666 A | 4/1993 | Knippscheer | |
| 5,610,589 A * | 3/1997 | Evans | G08B 21/245 340/573.1 |
| 5,793,653 A | 8/1998 | Segal | |
| 5,808,553 A * | 9/1998 | Cunningham | G08B 21/245 340/528 |

(Continued)

FOREIGN PATENT DOCUMENTS

| | | |
|---|---|---|
| WO | WO2012042285 | 4/2012 |
| WO | WO2013025956 | 2/2013 |
| WO | WO2015055971 | 4/2015 |

OTHER PUBLICATIONS

Texas Instruments—Low-Frequency in a Nutshell, Application Report SWRA284—Sep. 2011, p. 2.*

*Primary Examiner* — Joseph Feild
*Assistant Examiner* — Rufus Point
(74) *Attorney, Agent, or Firm* — Gable Gotwals

(57) ABSTRACT

Hospital-acquired infections or nosocomial infections are decreased when medical personal observe a hand washing protocol. A method is disclosed for encouraging adherence to a hand washing protocol when entering and exiting rooms of patients. A carried device, or badge, receives a first signal when proximate to a wash station. A first indicator on the badge displays indicates that that the wearer has visited the wash station. The badge receives a second signal when inside a patient's room, i.e., when visiting a first contaminated area. The badge may receive a third signal when entering a second contaminated area. A second indicator on the badge alerts the wearer when a countdown expires after washing, of failure to visit the wash station before the first room visit, or of failure to visit the wash station between room visits. Reporting data may be uploaded to a database.

15 Claims, 16 Drawing Sheets

(56) References Cited

U.S. PATENT DOCUMENTS

| | | | |
|---|---|---|---|
| 5,812,059 A | 9/1998 | Shaw et al. | |
| 5,952,924 A | 9/1999 | Evans et al. | |
| 6,009,333 A | 12/1999 | Chaco | |
| 6,038,331 A | 3/2000 | Johnson | |
| 6,154,139 A | 11/2000 | Heller | |
| 6,211,788 B1 | 4/2001 | Lynn et al. | |
| 6,219,164 B1* | 4/2001 | Morgaine | G08C 23/04 340/12.22 |
| 6,236,317 B1* | 5/2001 | Cohen | G08B 21/245 137/552.7 |
| 6,392,546 B1 | 5/2002 | Smith | |
| 6,417,773 B1 | 7/2002 | Vlahos et al. | |
| 6,424,285 B1* | 7/2002 | Perdue | G08C 17/02 341/176 |
| 6,426,701 B1* | 7/2002 | Levy | G08B 21/24 137/552.7 |
| 6,524,390 B1 | 2/2003 | Jones | |
| 6,572,564 B2 | 6/2003 | Ito et al. | |
| 6,647,649 B2 | 11/2003 | Hunt et al. | |
| 6,727,818 B1* | 4/2004 | Wildman | G06F 19/3418 340/573.1 |
| 6,814,816 B2 | 11/2004 | Achar et al. | |
| 6,838,992 B2 | 1/2005 | Tenarvitz | |
| 6,882,278 B2 | 4/2005 | Winings et al. | |
| 6,970,574 B1 | 11/2005 | Johnson | |
| 7,015,816 B2 | 3/2006 | Vv1ldman et al. | |
| 7,034,677 B2 | 4/2006 | Steinthal et al. | |
| 7,095,501 B2 | 8/2006 | Lambert et al. | |
| 7,171,312 B2 | 1/2007 | Steinthal et al. | |
| 7,236,097 B1 | 6/2007 | Cunningham | |
| 7,286,057 B2 | 10/2007 | Bolling | |
| 7,315,245 B2 | 1/2008 | Lynn et al. | |
| 7,372,367 B2 | 5/2008 | Lane et al. | |
| 7,375,640 B1* | 5/2008 | Plost | A47K 5/1217 340/500 |
| 7,408,470 B2 | 8/2008 | Wildman et al. | |
| 7,423,533 B1* | 9/2008 | LeBlond | G08B 21/245 340/572.1 |
| 7,443,305 B2 | 10/2008 | Verdiramo | |
| 7,482,936 B2 | 1/2009 | Bolling | |
| 7,570,152 B2 | 8/2009 | Smith et al. | |
| 7,978,083 B2 | 7/2011 | Melker et al. | |
| 8,006,542 B2 | 8/2011 | Jones, Jr. | |
| 8,212,653 B1* | 7/2012 | Goldstein | G08B 21/245 235/375 |
| 8,279,063 B2 | 10/2012 | Wohltjen | |
| 8,482,406 B2* | 7/2013 | Snodgrass | G08B 21/245 340/539.12 |
| 8,587,437 B2 | 11/2013 | Kyle et al. | |
| 8,844,766 B2 | 9/2014 | Zaima et al. | |
| 9,000,930 B2 | 4/2015 | Pelland et al. | |
| 9,027,795 B2 | 5/2015 | Zaima et al. | |
| 9,076,318 B2 | 7/2015 | Hawkins | |
| 9,235,977 B2 | 1/2016 | Deutsch | |
| 2002/0000449 A1* | 1/2002 | Armstrong | A47K 5/1217 222/52 |
| 2002/0183979 A1* | 12/2002 | Wildman | G06K 7/0008 702/188 |
| 2003/0030562 A1* | 2/2003 | Lane | G16H 40/20 340/573.4 |
| 2004/0001009 A1 | 1/2004 | Winings et al. | |
| 2004/0090333 A1* | 5/2004 | Wildman | G06F 19/3418 340/573.1 |
| 2005/0168341 A1 | 8/2005 | Reeder et al. | |
| 2006/0067545 A1* | 3/2006 | Lewis | G08B 21/245 381/124 |
| 2006/0071799 A1 | 4/2006 | Verdiramo | |
| 2006/0273915 A1 | 12/2006 | Snodgrass | |
| 2007/0008146 A1 | 1/2007 | Taylor et al. | |
| 2007/0008147 A1* | 1/2007 | Bolling | G08B 21/245 340/573.1 |
| 2007/0008149 A1 | 1/2007 | Bolling | |
| 2007/0015552 A1* | 1/2007 | Bolling | G08B 21/245 455/575.6 |
| 2007/0020212 A1 | 1/2007 | Bernal et al. | |
| 2007/0096930 A1* | 5/2007 | Cardoso | G08B 21/245 340/573.4 |
| 2008/0031838 A1 | 2/2008 | Bolling | |
| 2008/0103636 A1* | 5/2008 | Glenn | G06Q 10/00 700/302 |
| 2008/0246599 A1* | 10/2008 | Hufton | G01S 1/70 340/529 |
| 2009/0068116 A1 | 3/2009 | Arndt | |
| 2009/0091458 A1* | 4/2009 | Deutsch | G06Q 50/22 340/573.1 |
| 2009/0195385 A1* | 8/2009 | Huang | G08B 21/245 340/572.1 |
| 2009/0224907 A1* | 9/2009 | Sinha | G08B 21/245 340/539.11 |
| 2009/0267776 A1* | 10/2009 | Glenn | G08B 21/245 340/573.1 |
| 2010/0073162 A1* | 3/2010 | Johnson | G08B 21/245 340/540 |
| 2010/0117823 A1 | 5/2010 | Wholtjen | |
| 2010/0117836 A1* | 5/2010 | Seyed Momen | G01S 1/70 340/573.1 |
| 2010/0231385 A1 | 9/2010 | Melker et al. | |
| 2010/0285760 A1* | 11/2010 | Blosco | H04W 52/0206 455/103 |
| 2010/0297602 A1 | 11/2010 | Jones, Jr. | |
| 2010/0328076 A1 | 12/2010 | Kyle et al. | |
| 2010/0328443 A1* | 12/2010 | Lynam | G06K 9/00771 348/77 |
| 2011/0121974 A1* | 5/2011 | Tenarvitz | G08B 21/245 340/573.1 |
| 2011/0169646 A1* | 7/2011 | Raichman | G08B 21/245 340/573.1 |
| 2011/0187538 A1 | 8/2011 | Hawkins | |
| 2011/0227740 A1 | 9/2011 | Wohltjen | |
| 2012/0194338 A1* | 8/2012 | Snodgrass | G08B 21/245 340/539.12 |
| 2013/0127615 A1* | 5/2013 | Snodgrass | G05B 1/01 340/539.13 |
| 2014/0070950 A1* | 3/2014 | Snodgrass | G08B 21/245 340/573.5 |
| 2014/0169795 A1* | 6/2014 | Clough | G06F 19/3418 398/106 |
| 2014/0375457 A1* | 12/2014 | Diaz | G08B 21/245 340/573.1 |
| 2015/0332529 A1 | 11/2015 | Wong | |
| 2016/0203698 A1 | 7/2016 | Steinbok | |

\* cited by examiner

SYSTEM AND METHOD OF BIOLOGICAL AND GERM CROSS CONTAMINATION CONTROL

CROSS REFERENCE TO RELATED APPLICATIONS

This application claims the priority of U.S. Provisional Patent Application No. 62/389,113 entitled "METHODS OF BIOLOGICAL AND GERM CROSS CONTAMINATION CONTROL," filed Feb. 18, 2016, the contents of which are hereby incorporated by reference.

FIELD OF THE INVENTION

The present invention relates methods of preventing cross contamination of germs from one patient room to another through host interaction. In particular, the invention relates to an apparatus and method for alerting an individual to interface with a wash station before entering and upon exiting a contamination area.

BACKGROUND OF THE INVENTION

Healthcare Associated Infections or HAIs are infections that patients develop during the time of receiving healthcare treatment for other health conditions. Some infections can be associated with certain devices used in medical procedures, such as catheters or ventilators. These HAIs include central line-associated bloodstream infections, catheter-associated urinary tract infections, and ventilator-associated pneumonia among others.

Hospital-acquired infection also known as nosocomial infection develops in a hospital environment and is acquired by a patient during a hospital visit or one developing among hospital staff.

The CDC states the most common pathogens that cause nosocomial infections are *Staphylococcus aureus*, *Pseudomonas aeruginosa*, and *E. coli*. A lot of the common nosocomial infections are respiratory pneumonia, urinary tract infections, surgical site wound infections, bacteremia, gastrointestinal and skin infections. Urinary tract infections are the most common type of nosocomial infection. In the United States, surgical site infections, bloodstream infections, and pneumonia are the second most common types of infections.

The location of a nosocomial infection depends on the nature of a patient's hospital procedure. Methods for preventing nosocomial infection may include:
1.) Hand washing: before entering and exiting the room.
2.) Stethoscope: cleaning with an alcohol swab at least daily.
3.) Gloves: supplement rather than replace hand washing.
4.) Intravenous catheter: Clean thoroughly and disinfect the skin before insertion.

According to the World Health Organization, or WHO, washing your hands is the number one way to prevent the spread of germs from one host to another. A problem is that medical personnel get busy or forget to wash their hands and it's difficult to ensure that everyone is following hand washing guidelines. The WHO recommends at least 20 seconds of rubbing your hands together with soap and water to thoroughly clean your hands. Approximately 78% of people who wash their hands don't use soap and because of this the germs are not removed sufficiently. Therefore, ensuring that people wash their hands, as well as ensuring that they use soap or alcohol foam and rub for a period of time sufficient to remove any germs from their hands is the goal.

It is desirable to ensure that each person working in a facility or even visitors wash their hands before, during and after leaving a contaminated area. Therefore, it is desirable to provide an inexpensive solution that can assist personnel in developing proper hand hygiene.

SUMMARY OF THE INVENTION

An inexpensive solution for assisting personnel in developing proper hand hygiene can be achieved by using transmitters, such as IR transmitters, located in proximity to a wash station and in rooms where there can be a possible contamination, i.e., in contamination areas.

IR transmitters may include a room transmitter and a wash station transmitter. Both room transmitter and wash station transmitter may be exactly the same with regard to hardware and firmware. A simple A/B switch may be provided on the side or back of the unit to switch the transmission mode, e.g., "A" for wash station and "B" for room station.

A transmitter may have an "On/Off" switch to control the power consumption of the transmitter when it is not in use. Each transmitter may have a IR transmitter circuit that can either send "serial" data, e.g., in the form of 2400/8/N/1-9600/8/N/1, of which a carried device, such as a badge, can receive serial data and respond appropriately according to the reception of the incoming signal, e.g., either an "A Signal" or "B Signal". In another embodiment, a "C" transmitter signal is utilized, which resembles the "B" signal but differentiates one contaminated area from another so that the receiver badge knows when personnel switches from one contaminated area to another and to begin blinking RED if a decontamination has not occurred between rooms. In another embodiment, a simple timing mechanism is utilized, as explained below.

A second code type called "NEC" standard protocol 38 Khz can also be used to transmit a set of codes. A TSOP1736, which is 36 Khz used in RC5, is also capable of transmitting a set of codes whereby any "HEX" value can be sent using a RC5 code starting with 2 start bits "0x-(A4 . . . A0-C5 . . . C0)HEX CODE STRING" which is 14 bits long. Each code includes the beginning 2 start bits, 1 toggle bit, a 5 bit address and a 6 bit command.

A receiver in the carried device, e.g., a receiver in a badge, can be utilized to receive a signal from the IR transmitter that turns the badge LEDs from one state to another, e.g., from one indicator to a second indicator, such as from a flashing red or a flashing green condition according to the IR reception and timing of the IR reception.

If a receiver receives a first signal A, then the carried device enters into Mode 1 and shows a first indicator, e.g., flashes a bright green for a period of time. The flash time frame is variable and may be adjusted. The period of time allows time for the personnel to enter a room where a possible contamination could be located, i.e., the contaminated area. Once the person enters the contaminated area in a Mode 1 condition, the receiver will receive a second signal from the second transmitter, e.g., a second signal "B", at which time the carried device will enter both Mode 1 and Mode 2. The first indicator, e.g., the green flashing lights, will continue as long as the personnel remains in the contaminated area, i.e., as long as the receiver is able to receive the second signal B, which is transmitted at discrete time increments.

When the person leaves the contaminated area and approaches the wash station to wash their hands, the receiver will receive a signal A, whereupon the carried device returns to Mode 1 mode. In one embodiment, upon returning to Mode 1, a countdown is commenced. For example, Mode 1 mode may have a 20 second time decay to Off state. The countdown may be programmed to a different time increment. If the person does not exit the room, i.e., the contaminated area, before the countdown expires and/or that person omits visiting the wash station before the countdown expires, then the carried device will display a second indicator, e.g., the carried device may enter Mode 3 and flash a second indicator, e.g., will flash red. The flashing red indicator continues to flash until such time as the person visits a wash station to reset the timer so that the carried device is restored to Mode 1.

The system, therefore, encourages personnel to wash going in and out of a contaminated area. A second embodiment provides an fourth mode. In the fourth mode embodiment, Mode 0 is off Mode 1 results in a flashing green indicator; Mode 1 and 2 results in a continuing flashing green indicator and prolonging the flashing green state. Finally, Mode 3 results in a flashing red indicator.

DETAILED DESCRIPTION OF THE PREFERRED EMBODIMENTS

Referring now to the figures, shown as a biological and germ cross contamination system for use in a hospital or other areas of potential contamination.

Figure 1:
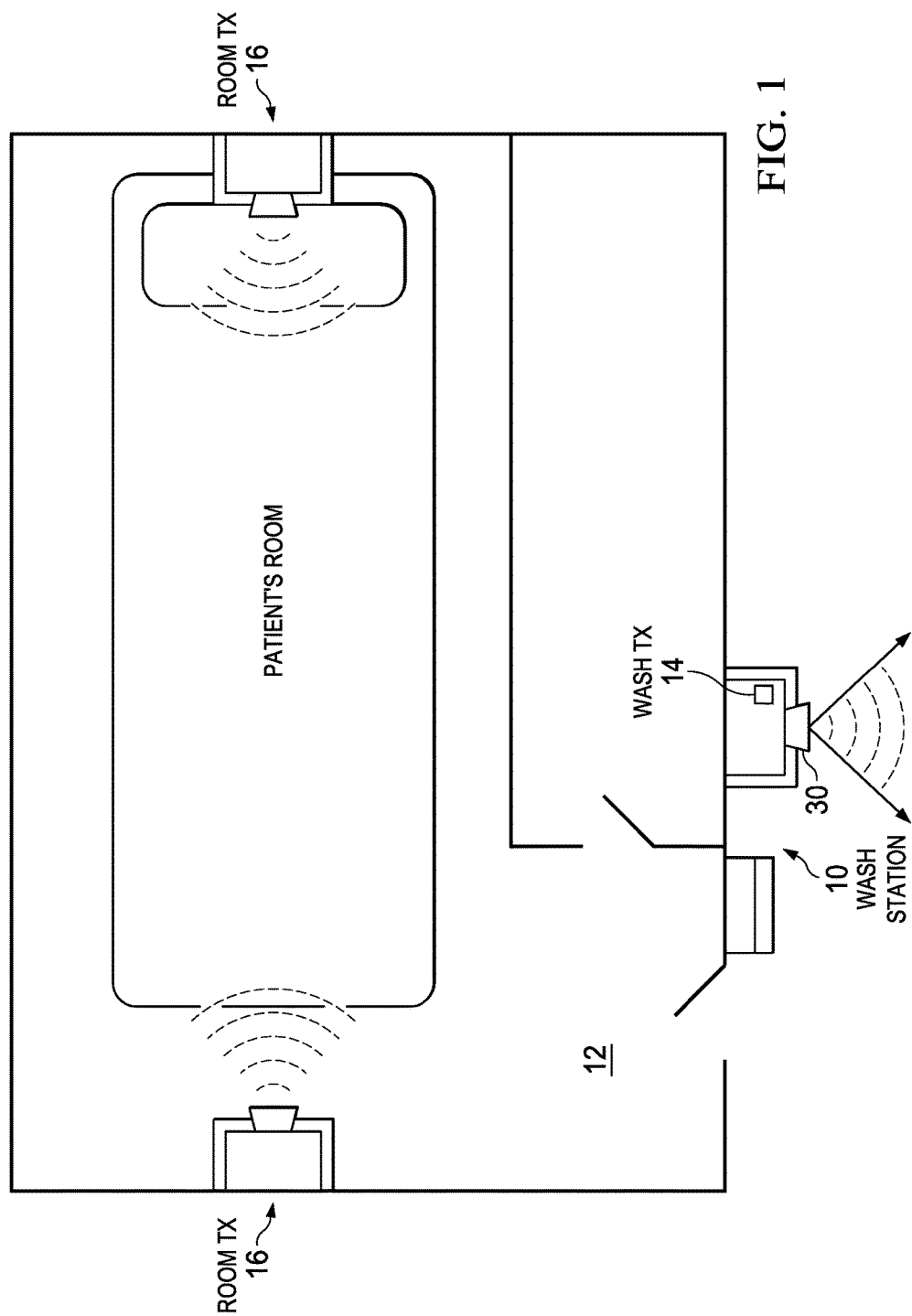
FIG. 1 is a plan view of an example contaminated area and wash station.
Figure 2:
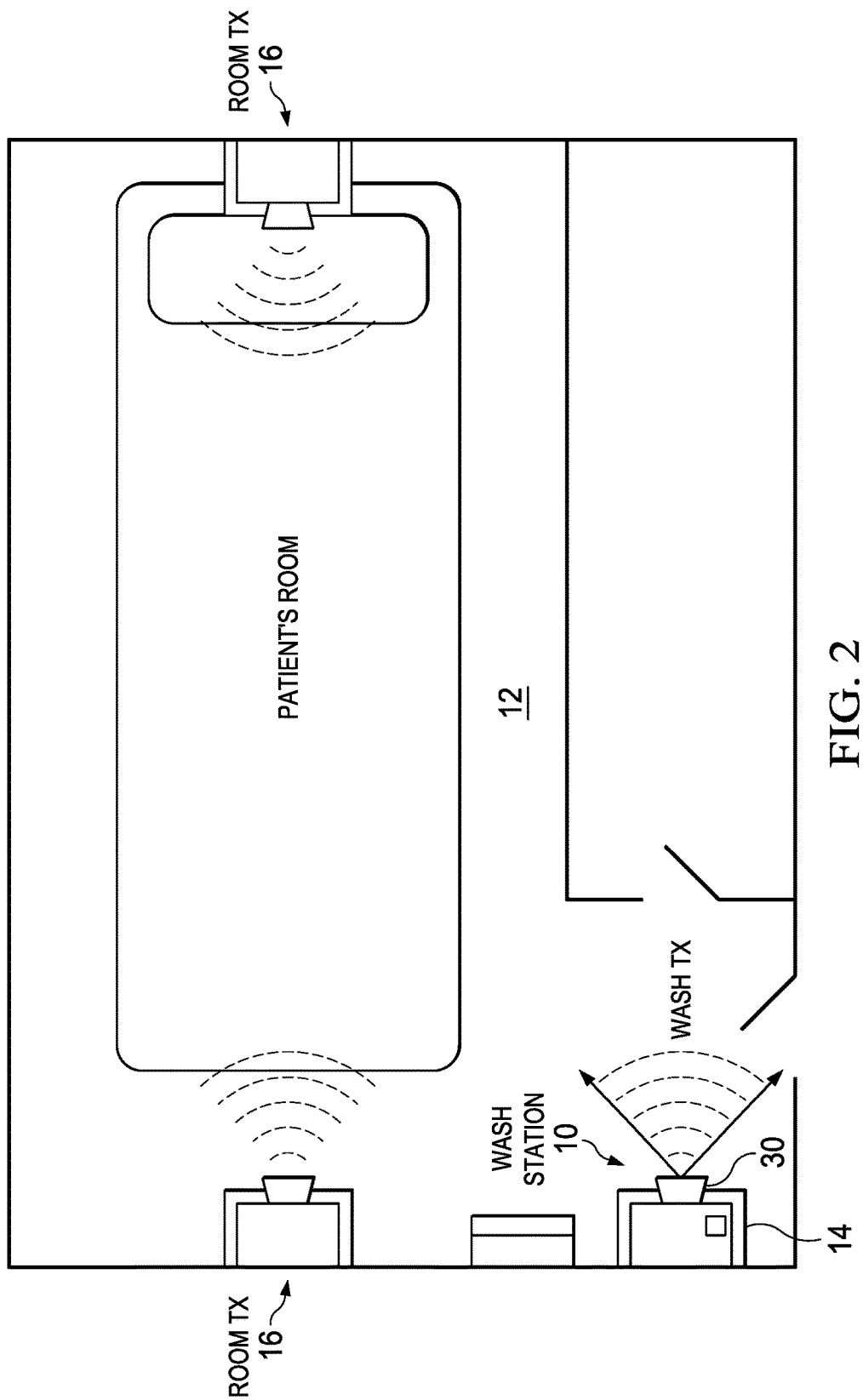
FIG. 2 is a plan view of a second example contaminated area and wash station.

Referring now to FIGS. 1 and 2, shown is wash station 10 and contaminated area 12. As shown in the Figures, an example contaminated area 12 may be a hospital room for a patient. Wash station 10 may be located outside of contaminated area 12, as is shown in FIG. 1. Alternatively, wash station 10 may be located inside of contaminated area 12 as shown in FIG. 2.

Figure 3:
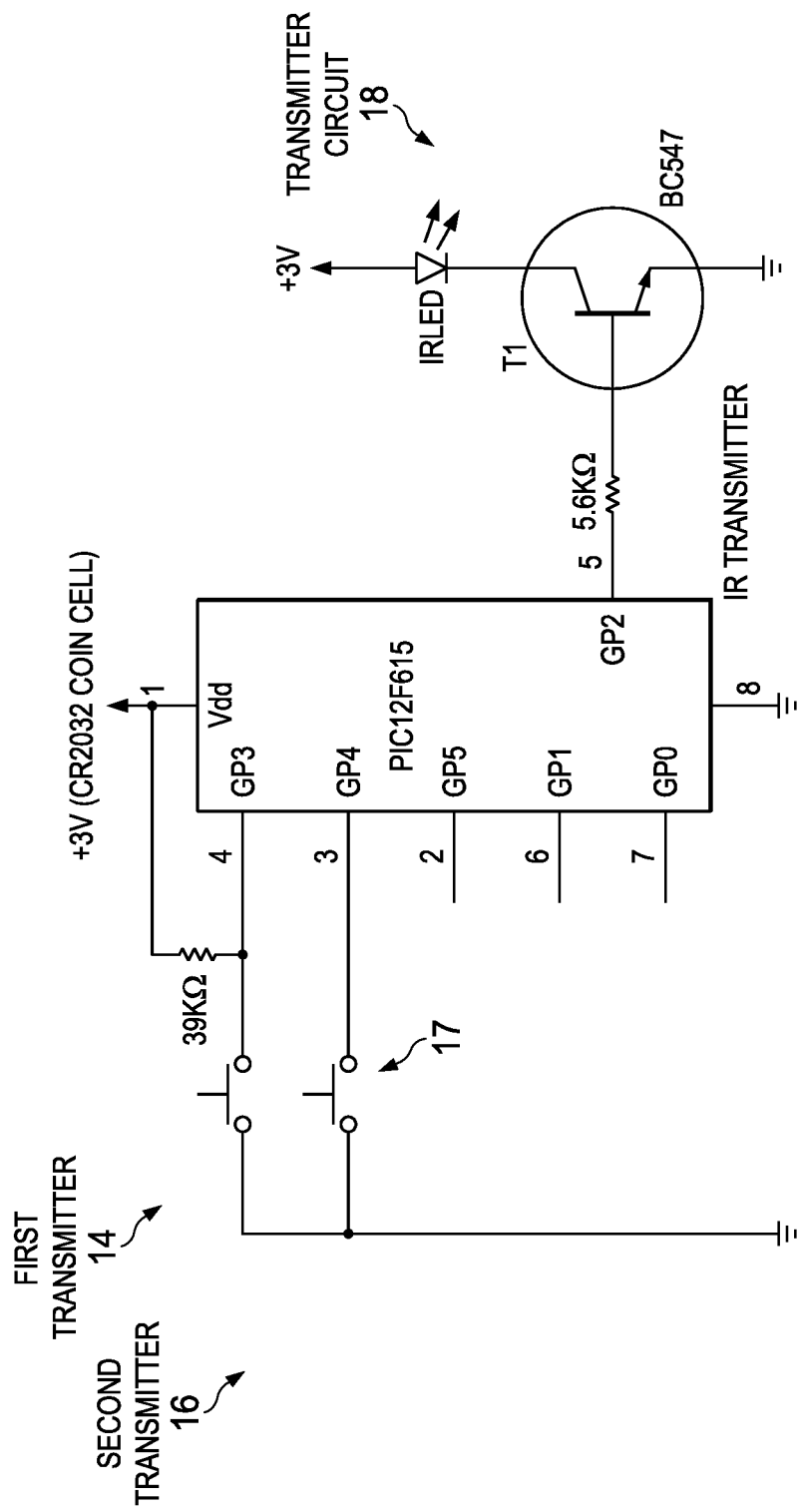
FIG. 3 is a schematic of an IR transmitter.

First transmitter 14 is located proximate to wash station 10. Second transmitter 16 is located in contaminated area 12. In one embodiment, first transmitter 14 and second transmitter 16 are the same hardware and firmware. An example transmitter is shown in FIG. 3. First transmitter 14 and second transmitter 16 are preferably provided with an A/B switch 17. for purposes of the explanation in this application, first transmitter 14 is set to setting "A" and second transmitter 16 is set to setting "B". Preferably, transmitters 14, 16 have an on/off switch to control power consumption of transmitters 14, 16 when they are not in use. Each transmitter 14, 16 includes a transmitter circuit 18. Transmitter circuit 18 is preferably an IR circuit that can send "serial" data in the form of 2400/8/N/1-9600/8/N/1. Alternatively, a second code type called "NEC" standard protocol 38 Khz can also be used to transmit a set of codes. A TSOP1736, which is 36 Khz, and which is used in RC5, is also capable of transmitting any set of codes whereby any "HEX" value can be sent using a RC5 code starting with 2 start bits that is 14 bits long. Each code includes the beginning 2 start bits, 1 toggle bit, 5 bit address and a 6 bit command.

Figure 4:
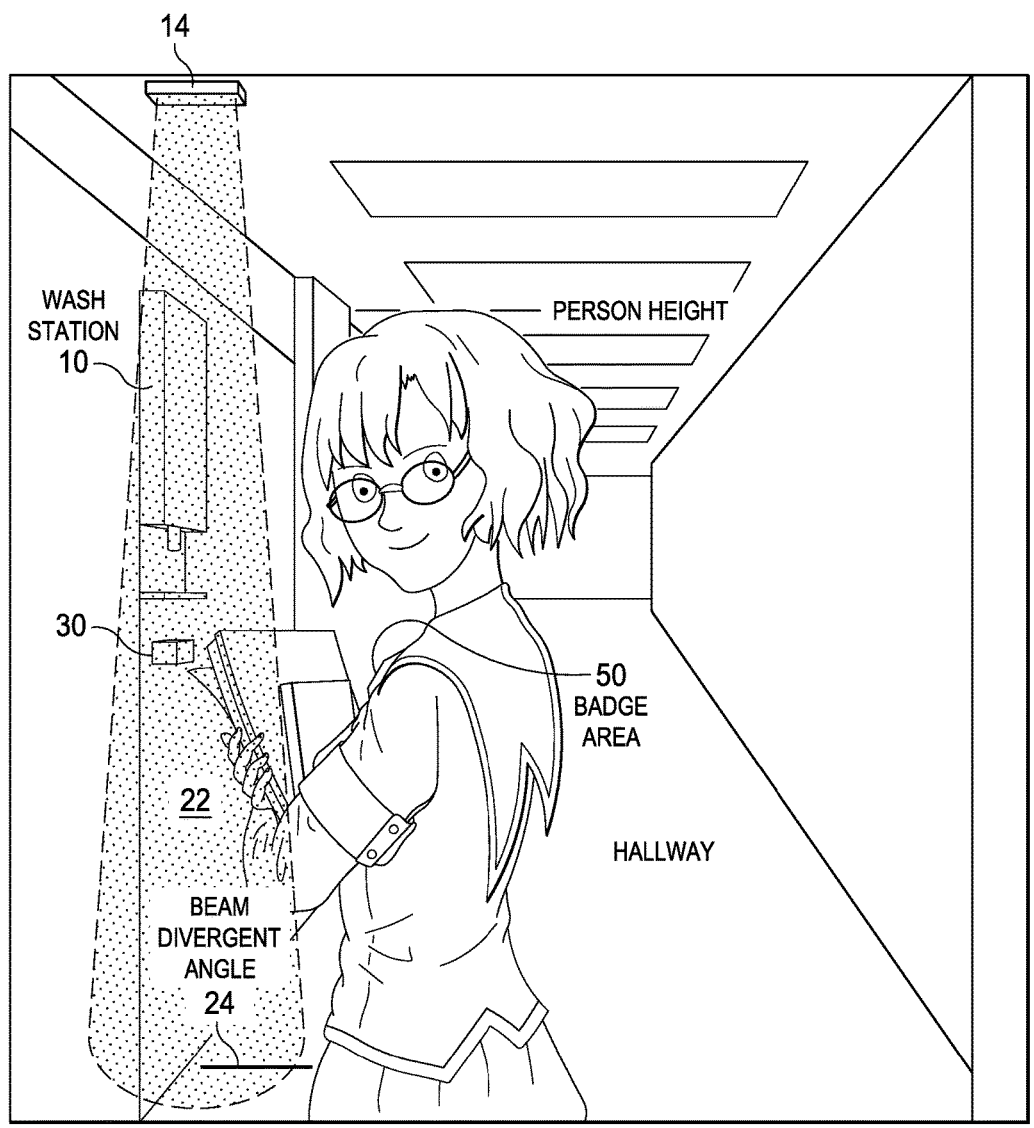
FIG. 4 a perspective view of a person and carried device proximate to a wash station with transmitter.
Figure 5:
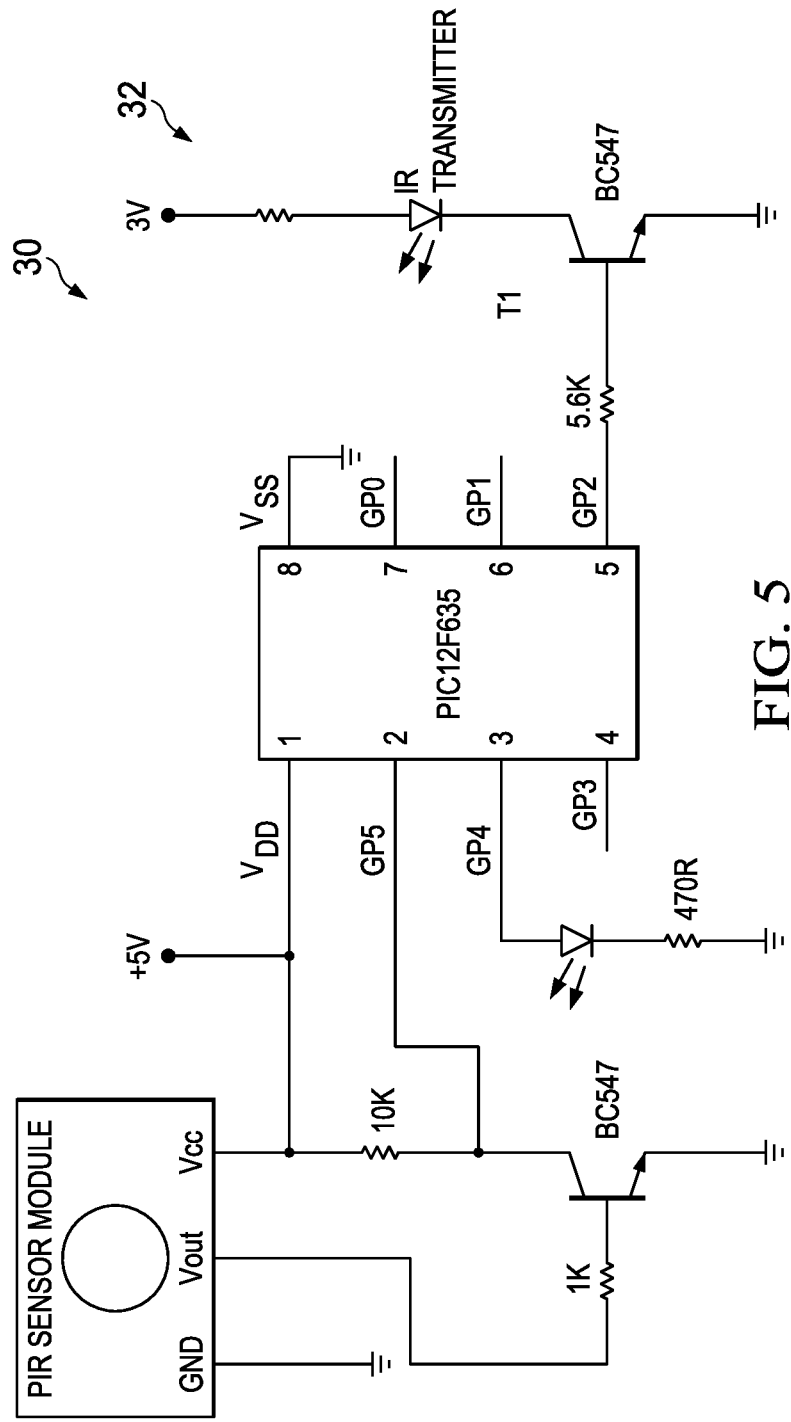
FIG. 5 is a schematic of a motion detector.

When first transmitter 14 is set to setting "A", then first transmitter 14 transmits a signal A. First transmitter 14 is located adjacent to wash station 10. First transmitter 14 preferably transmits signal A for a short distance, e.g., for approximately three feet. In one embodiment, as shown in FIG. 4, first transmitter 14 is located seven feet above the floor and approximately two feet above wash station 10 so that first transmitter 14 will transmit down a cone transmission beam 22 towards the ground having a beam divergence of 16°. For example, at a height of 7 feet, the floor radius 24 of beam 22 is 3 feet. Cone transmission beam 22 may have a beam divergence of 12 to 20 degrees, 10 to 22 degrees, or 8 to 24 degrees. The beam divergence of cone transmission beam 22 should be smaller than 1.0 meters, preferably, 0.5 meters or less, or signal A be unintentionally received when a person is not utilizing wash station 10. Advantages associated with limiting the signal strength to a field surrounding a limited area around the wash station, e.g., up to 0.5 meters, avoids causing other badges or receivers in the signal area to be activated prior to visiting wash station 10, which could result in a false activation, thereby allowing personnel to avoid the wash station 10 without detection. By limiting the signal area to less than 0.5 meters, the person must be directly at wash station 10 to receive signal A.

Figure 6:
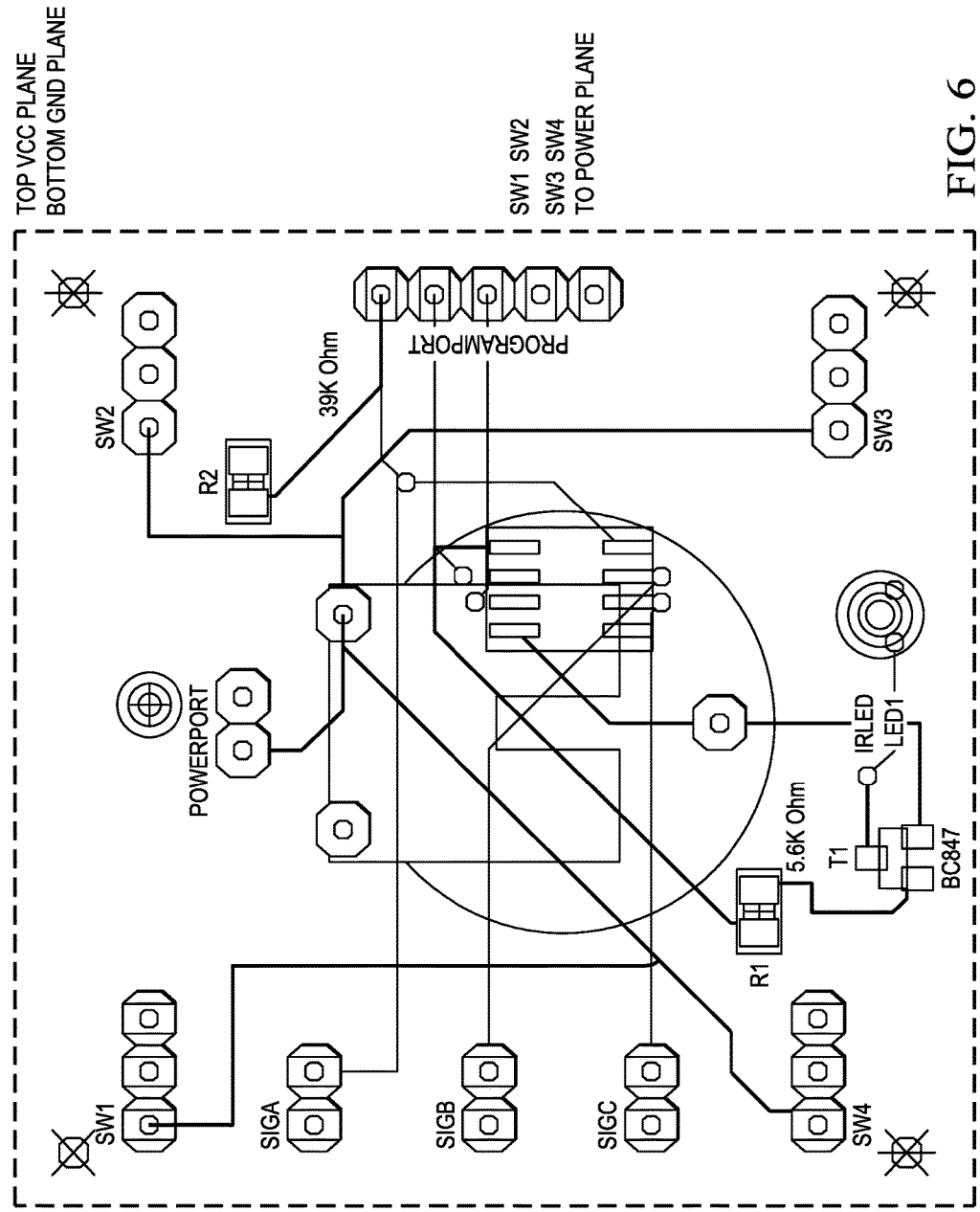
FIG. 6 is a circuit design of a light touch sensor.

Activator 30 (FIGS. 1, 2, 4, and 6) is located at wash station 14 proximate to first transmitter 14 for activating first transmitter 14. Activator 30 may be motion detection circuit 32 (FIG. 6). Alternatively, activator 30 may be a "light touch sensor" or other button or switch may be located on first transmitter 14 at wash station 10 to allow a signal to only be transmitted when carried device 50 is within the area of wash station 10. In one embodiment, the light touch sensor is a four (4) way parallel avalanche switching circuit board which takes a NO switch and closes it upon any minute pressure. Switches are 4 sides of a circuit board, wherein any of the switches may act as a contacting switch, thereby providing power to a circuit and sending a signal. light touch sensor is shown in FIG. 6. The light touch sensor utilizes a PIC1615 SN MCU and a simple IR transmitter LED.

Therefore, first transmitter 14 at wash station 10 only requires power to be used when the personnel is proximate wash station 10. Power delivery to wash station 10 may be limited to a single pulse signature drawing less than 20 mA Sec. Therefore, transmitter 14 at wash station 10 will remain operable up to 2 years on a single CR2032 Lithium battery.

Figure 7:
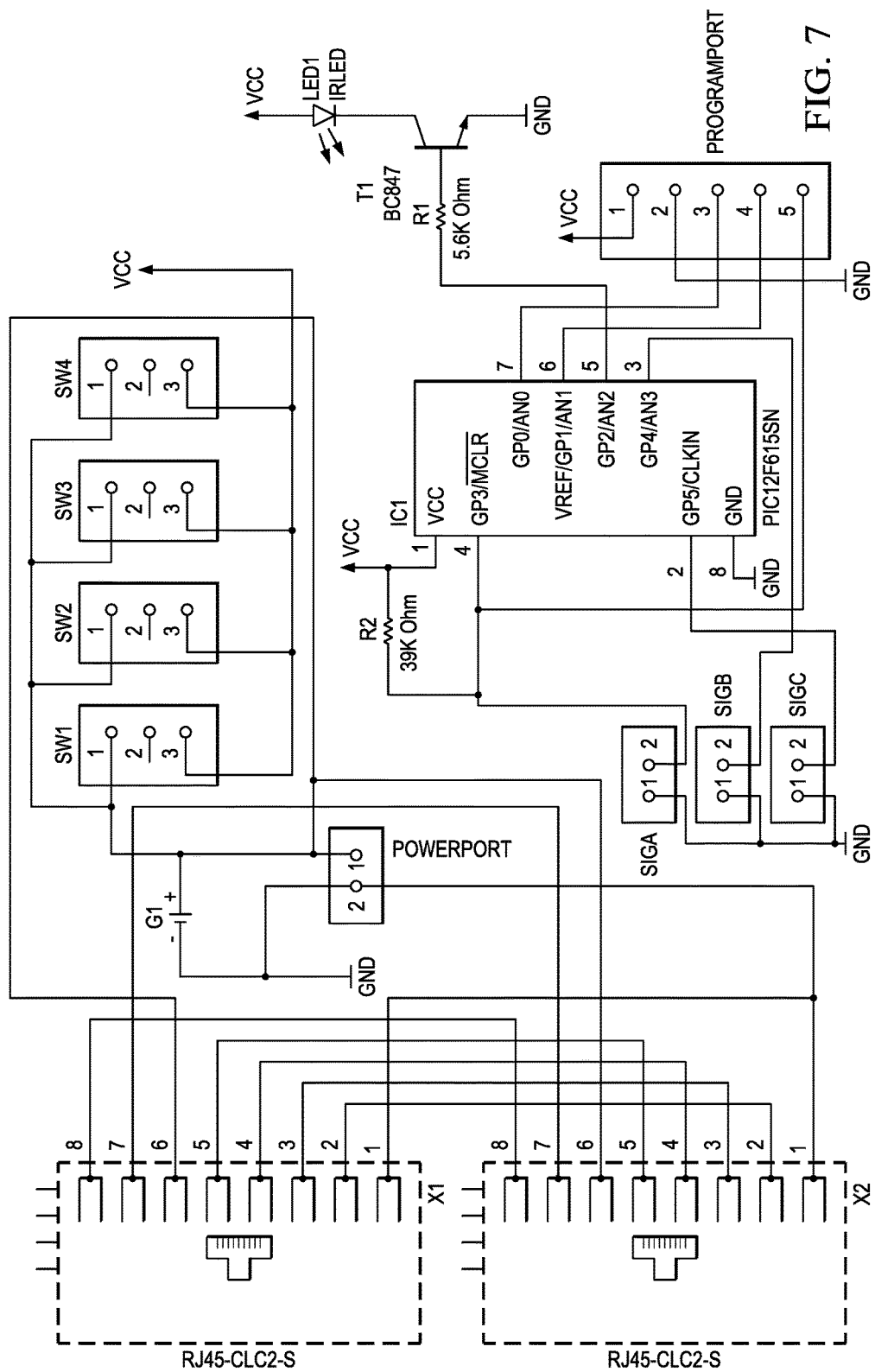
FIG. 7 is an electrical schematic of a sensor powered by a POE configuration.
Figure 8:
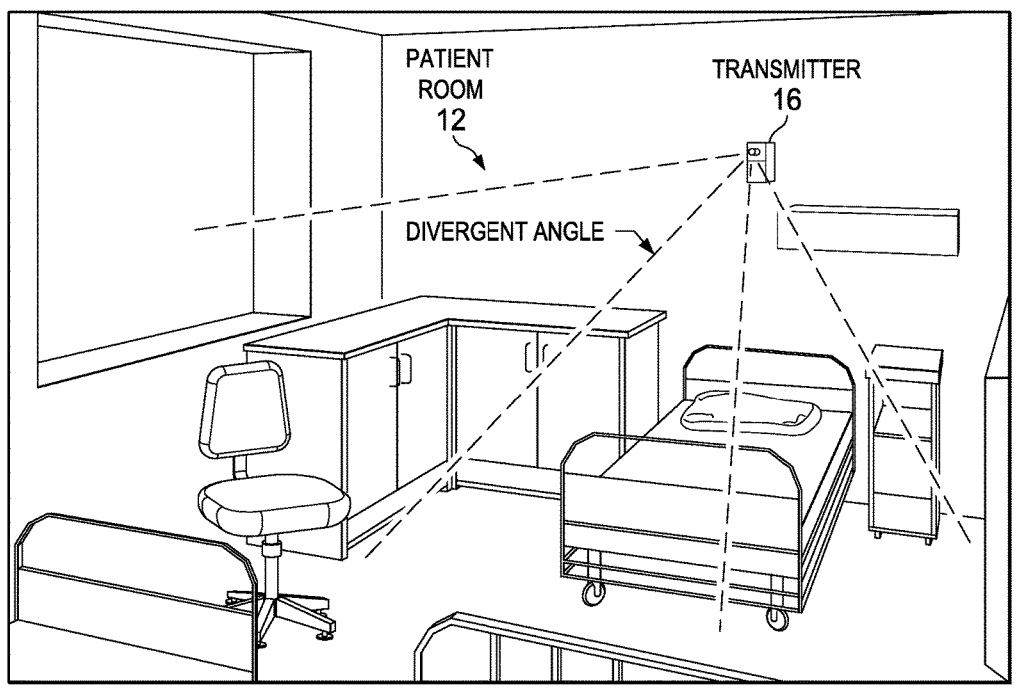
FIG. 8 is a perspective view of a contaminated area with transmitter.

When second transmitter 16 is set to setting "B", then second transmitter 16 transmits a signal B. Second transmitter 16 is placed within contaminated area 12. In one embodiment, as shown in FIG. 6, second transmitter 16 is placed above a bed and pointed perpendicular to a hallway to avoid transmitting signal B into the hallway. Second sensor 16 in contaminated area 12 is preferably powered by a simple pass through using the current POE (Power over Ethernet) ports located in each room. As can be seen in FIG. 7, a pass through POE is a passing of the twisted pair of wires on an RJ45 and parasitically powering the continuous pulse IR transmission signal. Therefore, installation is easy. An additional benefit associated with using a POE is that the Ethernet port remains open. In contrast, prior art systems either require extreme battery replacement maintenance, monthly battery exchange, or a hard wired installation that is labor intensive and can only be installed when the contaminated areas are not occupied. If POE is utilized to power first transmitter 14, then use of activator 30 is less important.

Figure 9:
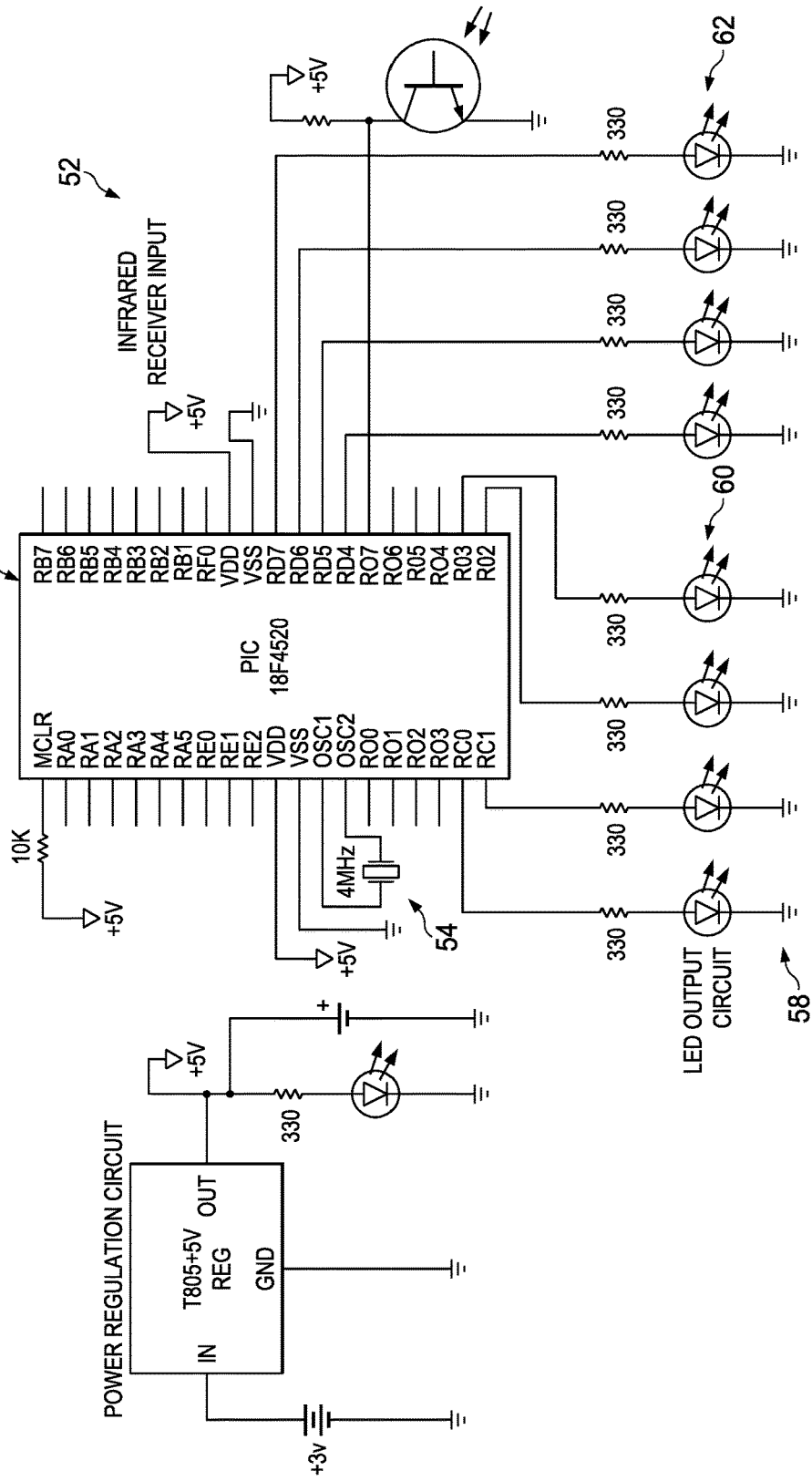
FIG. 9 is a schematic of a carried device.

Carried device 50 (FIGS. 4 and 9) is adapted to be carried on a person, such as a healthcare provider. Carried device 50 may be provided in the form of a badge. Carried device 50 includes receiver 52, transmitter 54, microcontroller unit 56 and indicator 58. Microcontroller unit 56 is in communication with receiver 52, transmitter 54 and indicator 58.

Indicator 58 may be a visual indicator for indicating that a person has visited wash station 10. Indicator 58 may be LEDs that flash a first color, such as green. Indicator 56 preferably flashes a second color, such as red, when secondary signal B is received. In the embodiment shown in FIG. 9, indicator 58 includes first LEDs 60, which are green, and second LEDs 62, which are red. Alternatively, indicator 58 may notify a wearer by other means such as vibration, audible indicator or by other means.

In one embodiment, microcontroller unit 56 assigns one of three status conditions to receiver 52. Microcontroller unit 58 assigns a status condition of Mode 1 wherein indicator 58 flashes green. Under a status condition of Mode 2, indicator 58 will continue to flash green in a prolonged flashing green state. Under status condition Mode 3, indicator 58 will flash red.

Figure 10A:
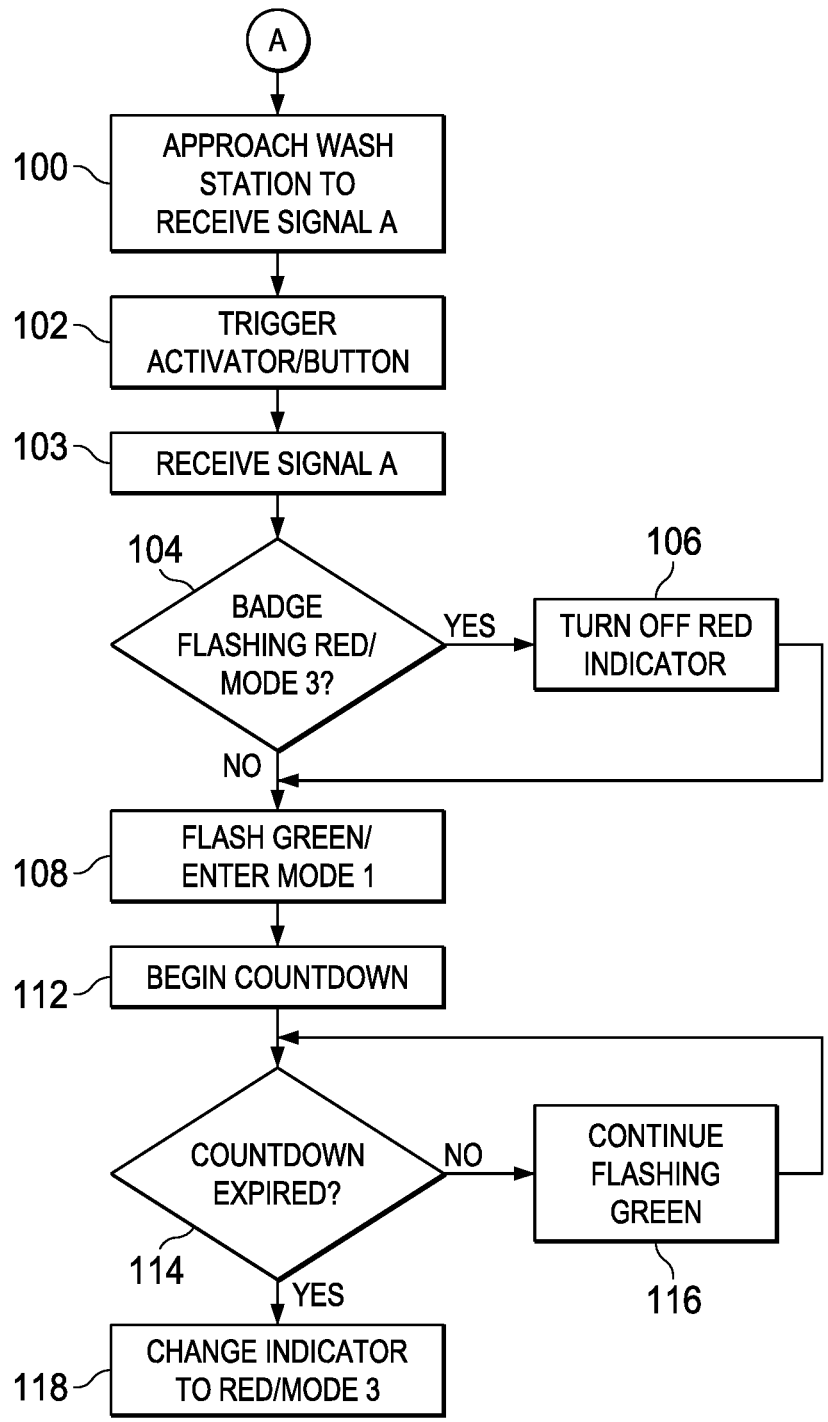
FIG. 10A is a flow chart representing the interaction of the carried device and the wash station transmitter.
Figure 10B:
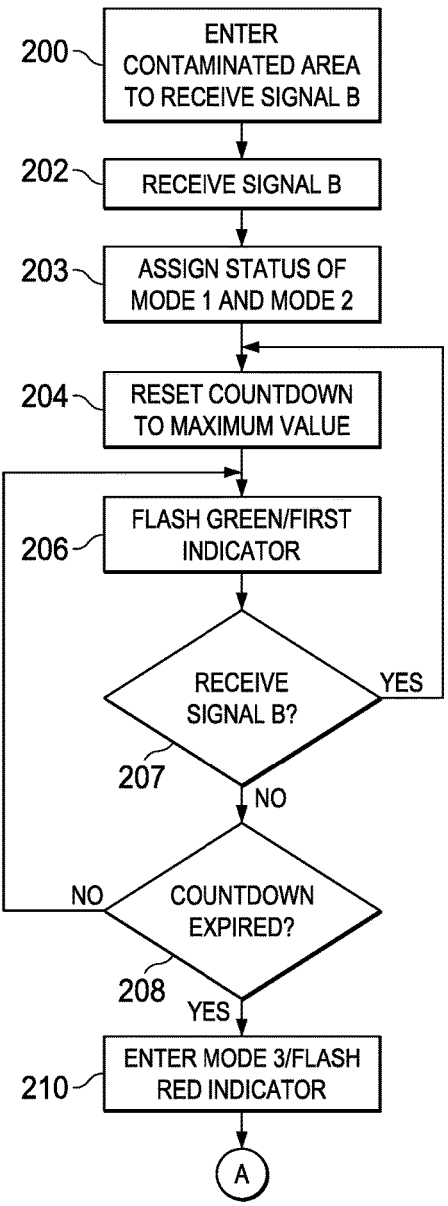
FIG. 10B is a flow chart representing the interaction of the carried device and the contaminated area transmitter.

Referring now to the flowchart of FIGS. 10A and 10B, the method of biological and germ cross contamination control is explained. A person wearing the carrier device 50 enters the proximity of wash station 10 to wash their hands, as set forth in step 100. Upon approaching wash station 10, the person will trigger activator 30, either by triggering motion detection circuit 32 or by activating a switch, as set forth in step 102. First transmitter 14 will then transmit signal A, which is received by receiver 52, as indicated in step 103.

Microcontroller unit 56 determines if carrier device 50 is in Mode 3, i.e., whether indicator 58 is flashing red, as shown in step 104. If carrier device 50 is in mode 3, i.e., if indicator 58 is flashing red, then microcontroller unit 56 instructs indicator 58 to cease flashing red, as shown in step 106 and to begin flashing green, as shown in step 108. If carrier device 50 is not in mode 3, i.e., if indicator 58 is not flashing red, then microcontroller unit 56 assigns a status of mode 1, i.e., instructs indicator unit 56 to flash green, as is shown in step 108.

In one embodiment, microcontroller unit 56 begins a countdown, as shown in step 112. Microcontroller unit 58 then determines if the countdown has expired as shown in step 114. If countdown has not expired, then indicator 58 continues to flash green as shown in step 116. If the countdown has expired, then microcontroller unit 56 assigns a status of Mode 3 and instructs indicator 58 to blink red once again, as shown in step 118.

As can be appreciated from the above description, a person wearing carried device 50 must approach wash station 12 to receive signal A from first transmitter 14 to have indicator 58 show a green flashing signal. In one embodiment, the green flashing signal will last until a timer expires, at which time indicator 58 will revert to flashing a red signal.

Upon achieving a green flashing signal from indicator 58, the person may then leave wash station 10 and enter a contamination area 12. Upon entering contamination area 12, receiver 52 of carried device 50 will receive signal B from second transmitter 16, as set forth in step 200. Preferably, second transmitter 16 transmits an ASCII B signal, which is a unique code of multiple pulses. Second transmitter 16 may also send a pulsed timed signal wherein receiver 52 measures a timed pulse, e.g., at a pulse rate of 400 milliseconds between off and on states. Signal B preferably spans 180° for covering the entire room or contaminated area 12 with an IR signature. Additionally, transmission of signal B preferably pulses a recount signal every five seconds to keep the countdown of step 112 reset to a predetermined value, thereby preventing the triggering of a switch to red by indicator 58, as indicated in step 118.

Referring now to FIG. 10B, after entering contaminated area 12, as shown in step 200, and upon receipt of signal B, as shown in step 202, microcontroller unit 56 will then assign Modes 1 and 2 as shown in step 203. A countdown conducted by microcontroller unit 56 will be reset to a predetermined value, e.g., 20 seconds, as shown in step 204. Indicator 58 will flash green as indicated in step 206. A determination is made whether an additional signal B was received, as indicated in step 207. If yes, then the countdown is reset, as indicated in step 204. If no, then microcontroller unit 58 will then determine whether the countdown has expired, as shown in step 208. If the countdown has not expired, indicator 58 will continue to flash green, as shown in step 206. If the countdown has expired, then microcontroller unit 58 assign a status of Mode 3 and indicator 58 will then flash red, as shown in step 210. The wearer will, therefore, be alerted that they should return to wash station 10 upon exiting contaminated area 12. The step of returning to wash station 10 is set forth in step 100, whereupon microcontroller 56 of carried device 50 will assign a status of mode 1 and indicator 58 will begin to flash green as shown in step 108.

If receiver 52 receives signal A from wash station 10 before expiration, then microcontroller 56 of carried device 50 may assign alternative mode 4 and shut off carrier device 50, as shown in step 209. If the countdown expires, then microcontroller 56 assigns a status of mode 3 and the indicator 56 flashes red, as is shown in step 210.

Figure 10C:
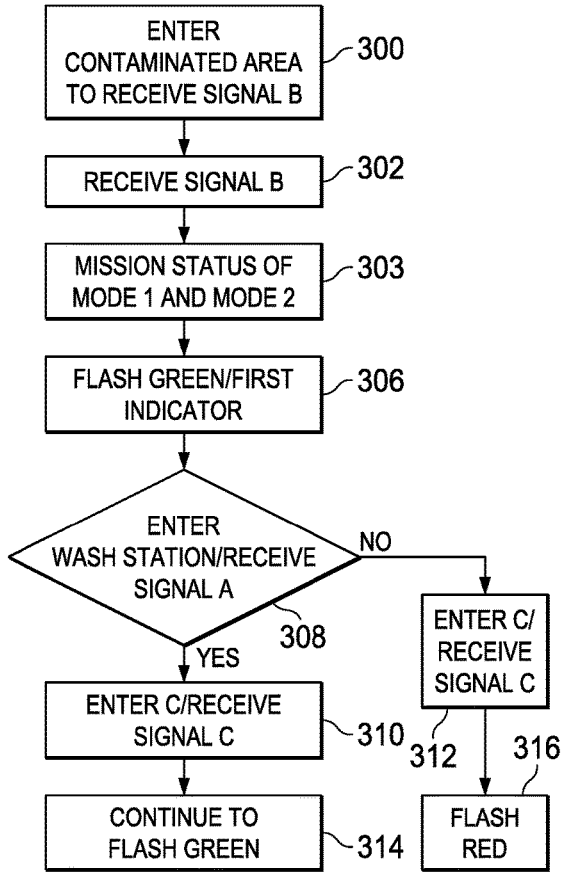
FIG. 10C is a flow chart representing the interaction of the carried device and a first contaminated area transmitter in a first contaminated area and a second contaminated area transmitter in a second contaminated area.
Figure 11:
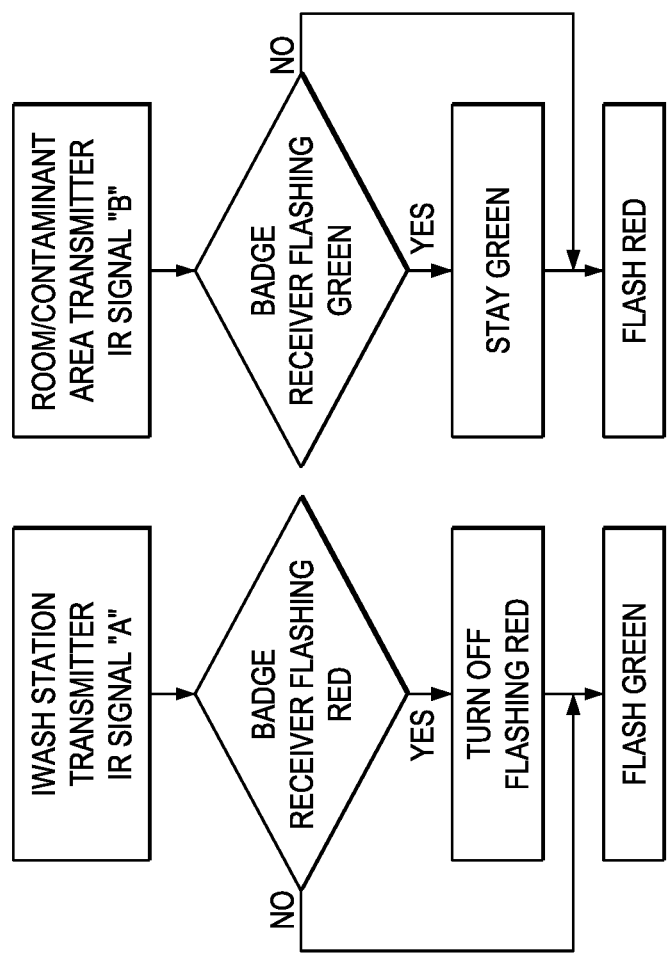
FIG. 11 shows a flow chart.

In alternative embodiment, shown in FIG. 10C, upon achieving a green flashing signal from indicator 58, the person may then leave wash station 10 and enter a first contamination area 12. Upon entering first contamination area 12, receiver 52 of carried device 50 will receive signal B from second transmitter 16, as set forth in step 300. Preferably, second transmitter 16 transmits an ASCII B signal, which is a unique code of multiple pulses. Second transmitter 16 may also send a pulsed timed signal wherein receiver 52 measures a timed pulse, e.g., at a pulse rate of 400 milliseconds between off and on states. Signal B preferably spans 180° for covering the entire room or first contaminated area 12 with an IR signature.

Still referring to FIG. 10C, after entering contaminated area 12, as shown in step 300, and upon receipt of signal B, as shown in step 302, microcontroller unit 56 will then assign Modes 1 and 2 as shown in step 303. Indicator 58 will flash green as indicated in step 306. A determination is made whether the person visited wash station A before entering a second contaminated area, as shown in step 308. Upon entering the second contaminated area, a signal C is received, as indicated in steps 310 and 312. If the answer to the determination of step 308 is yes, then indicator 58 will continue to flash green, as shown in step 314. If the answer to the determination of step 308 is no, then microcontroller unit 58 will assign a status of Mode 3 and indicator 58 will then flash red, as shown in step 316. The wearer will, therefore, be alerted that they should return to wash station 10 upon exiting the second contaminated area. The step of returning to wash station 10 is set forth in step 100 of FIG. 10A whereupon microcontroller 56 of carried device 50 will assign a status of mode 1 and indicator 58 will begin to flash green as shown in step 108.

The method of the invention additionally includes communicating information to a database when a person wearing a carried device breaches protocol, i.e., when a person ignores a flashing red indicator 56. In one embodiment, a separate circuit design is placed on a 5 Pin communication port of the light touch sensor of FIG. 6. The separate circuit design may include an ATMega MPU and logger coding whereby carried device 50 flashes Red due to a break from the hand hygiene protocol. The code identifies the person by a GUID assigned to a person wherein the GUID is embedded in a device ID in MPU 56 of carried device 50. An example of the coding follows:

```
const char*DEVID1="vC5F064F41919B60";
// Scenario: "Database is open"
// Numeric Pin where you connect your RED LED HIGH
    State;
uint8_t pinDevid1=D0; // Example: the mailbox switch is
    connect to the Pin D0
if  (digitalRead(pinDevid1)==HIGH  &&  pinDevid
    State=false) {
// switch on pinDevid1 is ON
    if(DEBUG){Serial.println("pinDevid1 is HIGH");}
    pinDevid1State=true;
    // Sending request to Database when the pin is HIGH
    sendToPushingBox(DEVID1D); {
if      (digitalRead(pinDevid1)==LOW       &&
    pinDevid1State==true)
// switch on pinDevid is OFF{
    if(DEBUG){Serial.println("pinDevid1 is LOW");}
    pinDevid1State=false;
    // Sending request to Database when the pin is LOW
    //sendToDataBase(DEVID2); // Here you can run other
        scenarios creating a DEVID2 variable}}
```

Where "vC5F064F41919B60"=Device ID associated with Field in Database UserID respectively.

By utilizing "Go/No Go/Go" logistics, personnel are encouraged to wash when entering contaminated area 12 and wash when exiting contaminated area 12. Metrics, such as data including device condition and device ID used to generate a database record for the associated UserID, are only transmitted to the database if the Go/No Go/Go logistics are breached. Therefore, as long as personnel follow proper procedure, a metrics reading would not be transmitted to the database. The method of the invention, accomplishes two things: first, less data is transmitted and stored to the database as compared to a tracking and monitoring system that monitors and records personnel movement and behavior. The reduced data storage of the method of the invention allows for on sight data logging instead of expensive off site database and metrics logging.

The method of biological and germ cross contamination control of the invention is further described below.

The method utilizes a means to identify a wash station area for signal transmission, a means to send a first signal A to a receiving element, a means to receive said signal A in a receiving element to signify condition and location of said reception, a visible means to identify that a signal A has been received, a means to identify a contaminated area for signal transmission, a means to send a second signal B to a receiving element to signify condition and location of said element, a visible means to identify a signal B has been received, a means to time the exchange between signal A at wash station and signal B of contaminated area and a means to enclose transmitter and receiver to accommodate an ergonomic comfortable position on a person carrying said receiver.

A means to identify a wash station area for signal transmission is comprised of placing an IR transmitter at wash station areas that transmit a first IR signal A. This IR signal can be a burst or ASCII platform. By utilizing a motion detection circuit, the transmitter can send signals when motion is detected, thereby sending a first "A" signal to a receiving badge or element worn by personnel. A second method is to have the personnel push a button, which activates the transmitter to send a first signal "A" to the badge or element worn by the personnel, which triggers the badge to make a visual sign of reception.

A means to send a first signal A to a receiving element is comprised of an IR signature which sends pulse signals at 38 kHz to an IR receiver. A MCU or Microcontroller unit can interpret these pulses to differentiate between a first signal "A", which represents locality of the wash station. The MCU can change LEDs from one first color to a second color corresponding to said location. In one embodiment, the color flashing green LEDs are used to identify a visual indication of IR reception of the first Signal A.

A means to receive signal A in a receiving element to signify condition and location of the reception may be determined by an ASCII protocol whereby an ASCII signal is unique to said location of said transmitter corresponding to said transmitter's proximity to a wash station. The reception of a second signal type can be a burst timed signal whereby the signal A mode is signified by a 200 ms IR light burst which can be measured between the "Off" or "On" cycle.

```
if ((PERIOD_BETWEEN_BURSTS>=33) & (PERIOD_
    BETWEEN_BURSTS<41))
{
if ((MODE_DETECTED==1)/Strobe Green
{
```

A visible means to identify the signal A has been received is by blinking or strobing a set or series of LEDs of a specific color. In one embodiment, a flashing green color may be strobed to signify that the personnel has visited the wash station.

A means to identify a contaminated area for signal transmission is comprised of placing IR transmitters which send a second signal B to a receiving Unit worn by a personnel who either entered the room with a "Signal A" already enacted on their receiving unit at which the Signal B continues the flashing color until such time the personnel leaves the room. If the personnel did not enter the room with a first signal "A" already enacted on their receiver unit, the said receiver unit flashes a bright strobing "RED" color indicating the personnel needs to visit the wash station where the worn unit will reset to a flashing green after receiving the first signal A.

A means to send a second signal B to a receiving element to signify condition and location of the element is comprised of an IR LED which sends an ASCII B signal, which is a unique code of multiple pulses that differentiate between the letter A and letter B. The transmitter unit may also send a pulse timed signal whereby said receiver measures the timed pulse such as "400 ms" between OFF and ON states.

```
if((PERIOD_BETWEEN_BURSTS>=33) & (PERIOD_
   BETWEEN_BURSTS<41))
{
if  ((MODE_DETECTED==1)||(MODE_DETECTED==
   2)) // Both modes
{
MODE_DETECTED=2; //Mode B
MIN_TIMER_INC=0; //resets timer to 0 so it can count
   to 20 seconds
}
```

Here the code tells the receiver unit to reset the counter if the personnel enters the contaminated area with a first signal A (Mode 1) and a second signal B (Mode 2) which pulses a recount signal every 5 seconds to keep the pulse mode reset back to the 20 second decay count to Red.

A visible means to identify that a signal B has been received is comprised of red LEDs that flash or strobing a set or series of LED's of a specific color. In one embodiment, a flashing red color is strobed to signify that the personnel has visited the contaminated area. If the personnel has visited the wash station prior to entering the contaminated area, the receiver unit will strobe a green until the personnel leaves contaminated area. Once the personnel leaves the containment area, the timer on the receiver unit begins a count down. If the personnel visits the wash station after leaving the room, the receiver unit is reset and shuts off in 20 seconds. This time is adjustable. If the person omits going to the wash station after leaving the contaminated area, the badge will count down to 0 and turn a flashing red signifying that the personnel needs to visit the wash station to reset the receiver unit to flash green and finally to off state.

A means to time the exchange between signal A at wash station and signal B of the contaminated area is comprised of a counting timer that looks at the condition of Signal A (Mode 1) and Signal B (Mode 2), whereby the timer resets after each 5 second IR transmission of Signal B.

```
void delay_routine( )
{
delay_inc=0;
while (delay_inc<=delay_time)
{
delay_inc++;
delay_ms(300);
if(!(MODE==(input(PIN_C6))))
{
delay_ms(400);
delay_inc=delay_time+1;
}
}
}
```

The code above shows a count down from 300 ms in Mode 1 and 400 in Mode 2. This is called a "sub routine", where the modes are selected according to the IR reception respectively.

A means is provided to enclose transmitter and receiver to accommodate an ergonomic comfortable position on a person carrying said receiver.

The application of this circuit design further consists of a visual reminder that identifies that the personnel has visited the wash station by sending a "A" code to turn on the primary green flashing indicator, whereby the personnel then visits a location of possible contamination and then continues to activate the visual alert by continual illumination of the green flashing indicator by a secondary code "B". The alert may also be by vibrating or by other visual or physical indicators to give patients or other personnel solace in the fact this person has visually shown to have visited the wash station prior to entering the area of contamination. However, if an indicator is not flashing green prior to entering the area of possible contamination, the visual indicator will receive a secondary "B" signal whereby green condition is not true and reception of signal B is true, thereby giving a visual indication of a flashing red indicator. This flashing red indicator will alert other personnel and patients that personnel wearing the indicator has not visited the wash station and to needs to remove possible contamination at a contamination removal device.

The application of circuit design includes a 4 step process that provides a visual alert to those working in areas where cross contamination occurs:

Step 1: Visit wash station and receive IR transmitter signal "A" and turn flashing green indicator;

Step 2: Enter room and receive IR signal "B" for continuation of flashing green indicator to remain active within given time frame;

Step 3: Enter room and receive IR signal "B" without flashing green indicator active and flash red indication to remind to visit wash station;

Step 4: Visit wash station receive IR Transmitter signal "A", which turns off red flashing indicator and turns on green flashing indicator and repeats Step 2.

FIG. 6 shows a flow chart of a logical means to achieve proper identification of proper hand hygiene of personnel and how the proposed system assists in helping personnel develop proper hygiene to prevent the spread of cross contamination of germs and preventing the spread of diseases from one host to another host.

Figure 12:
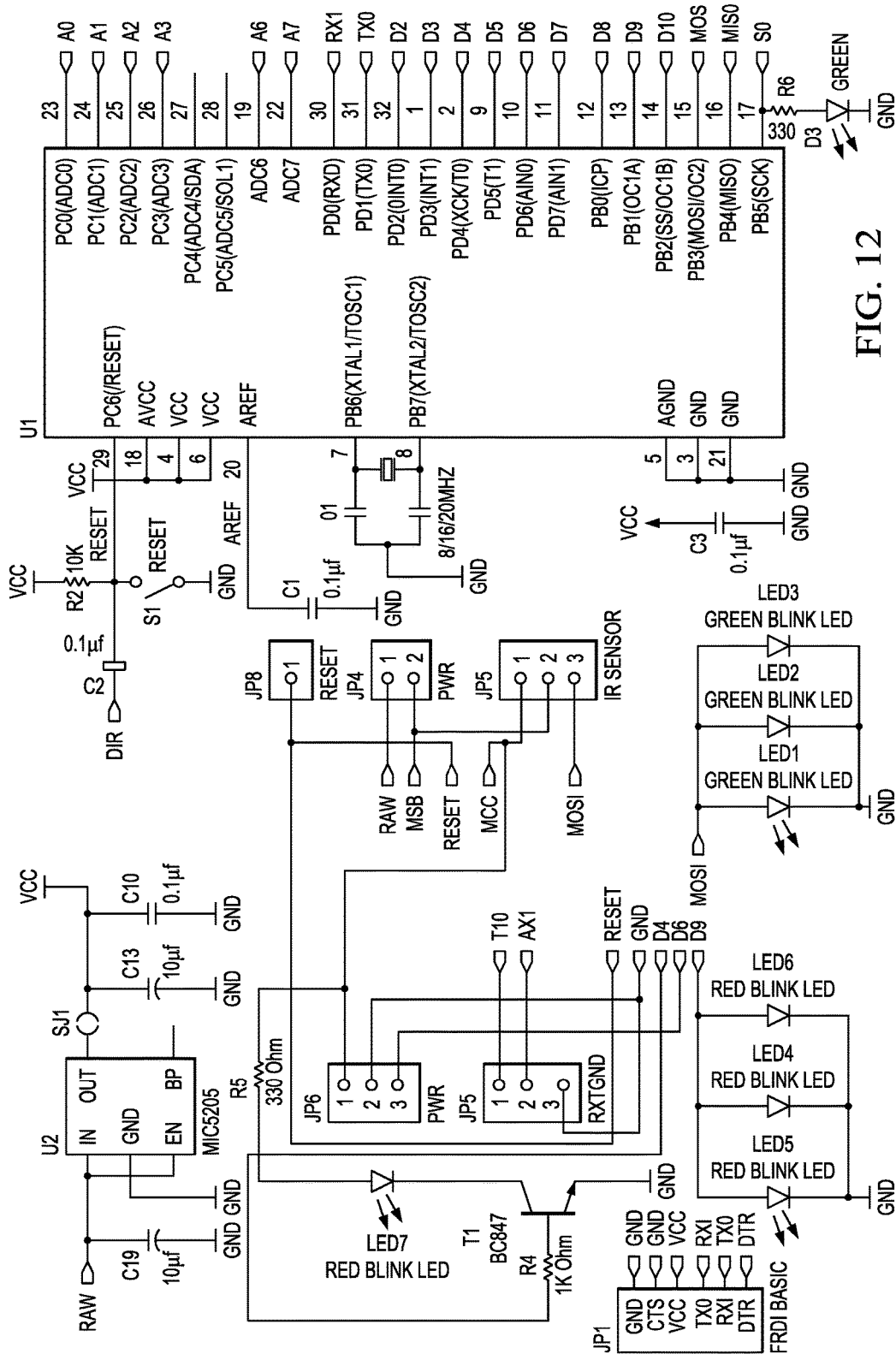
FIG. 12 shows a schematic diagram for the transmitter unit using a ATMega.

FIG. 12 shows a schematic diagram for the transmitter unit (e.g., transmitter 14 or transmitter 16) using a ATMega design, which utilizes an IR transmitter connected to an ATMega MCU, which processes the signal information for transmitting a signal A mode if located by a wash station or a signal B mode if located in a contaminated area. The pinout shown is exemplary only. One skilled in the art may develop different circuit arrangements and programming to effect the systems and methods of the present disclosure.

Figure 13:
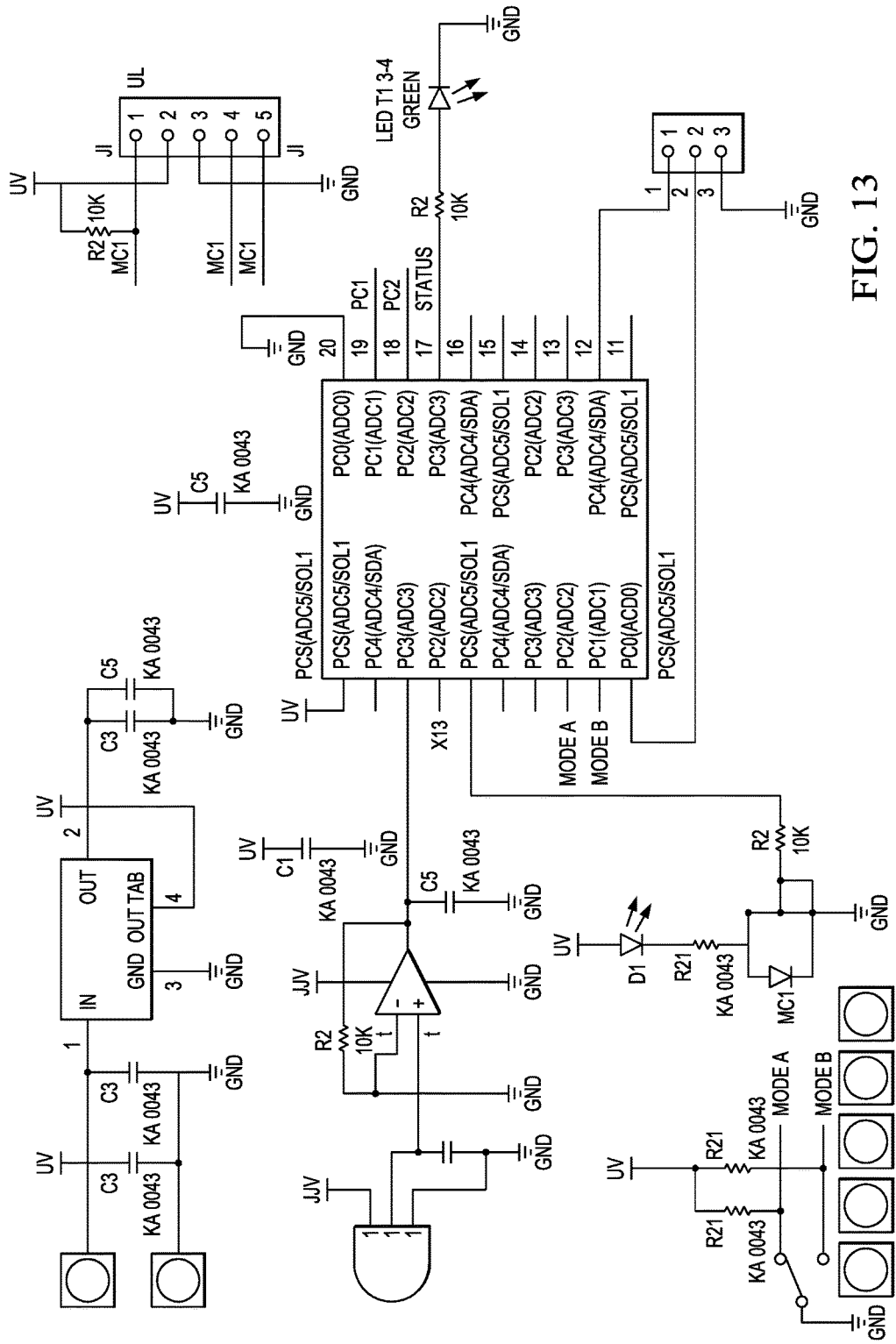
FIG. 13 shows a schematic diagram for the transmitter unit using a PIC MCU.

FIG. 13 shows a schematic diagram for the transmitter (e.g., transmitter 14 or transmitter 16) unit using a PIC MCU design, which utilizes an IR transmitter connected to a PIC microcontroller unit MCU which processes the signal information for transmitting a signal A mode if located by a wash station or a signal B mode if located in a contaminated area. The PIC was chosen in this example due to ease of manufacturing and lower cost silicon solution as well as being manufactured in the US.

Figure 14:
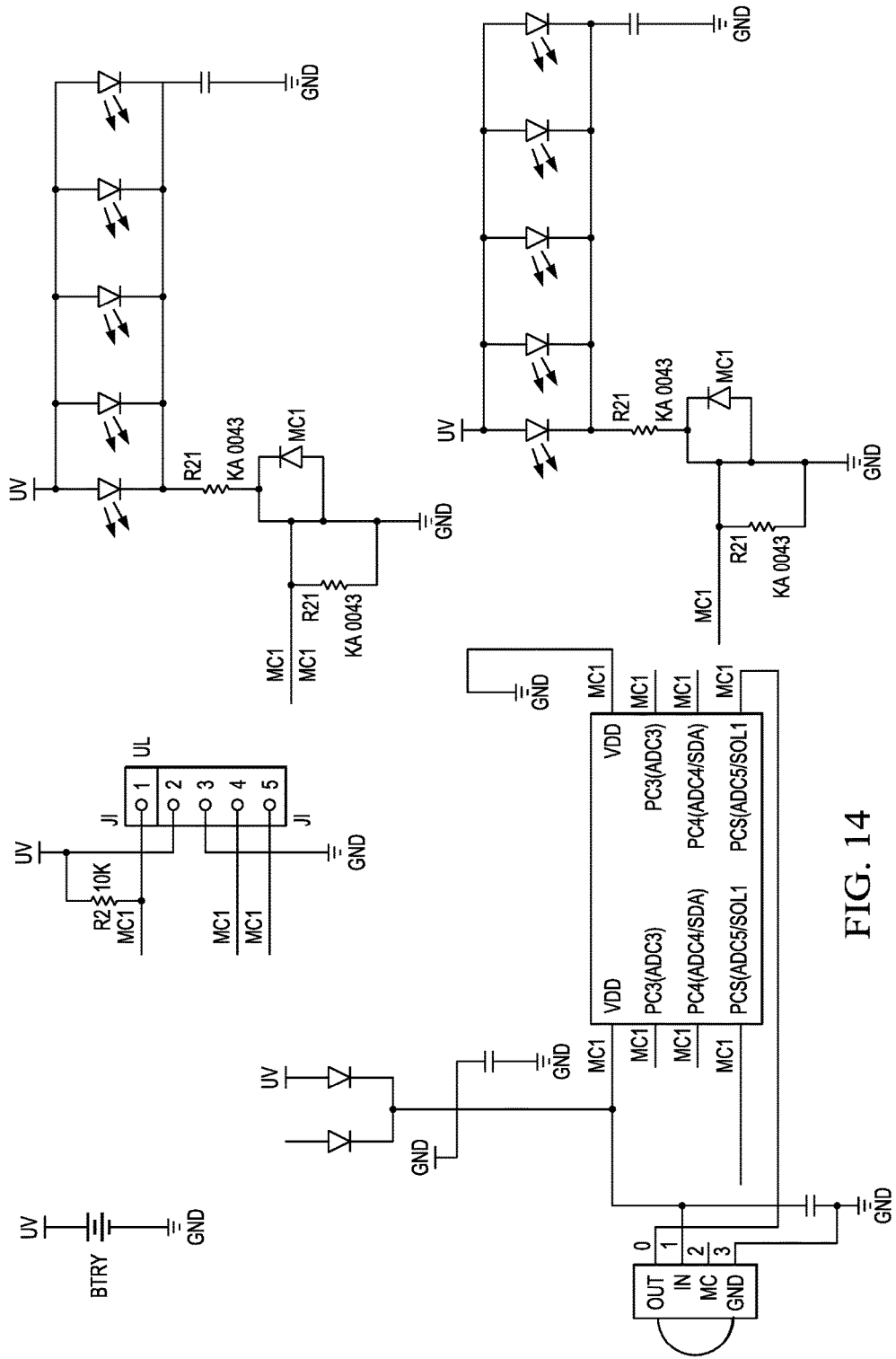
FIG. 14 shows a schematic diagram for the receiver unit using a PIC MCU.
Figure 15:
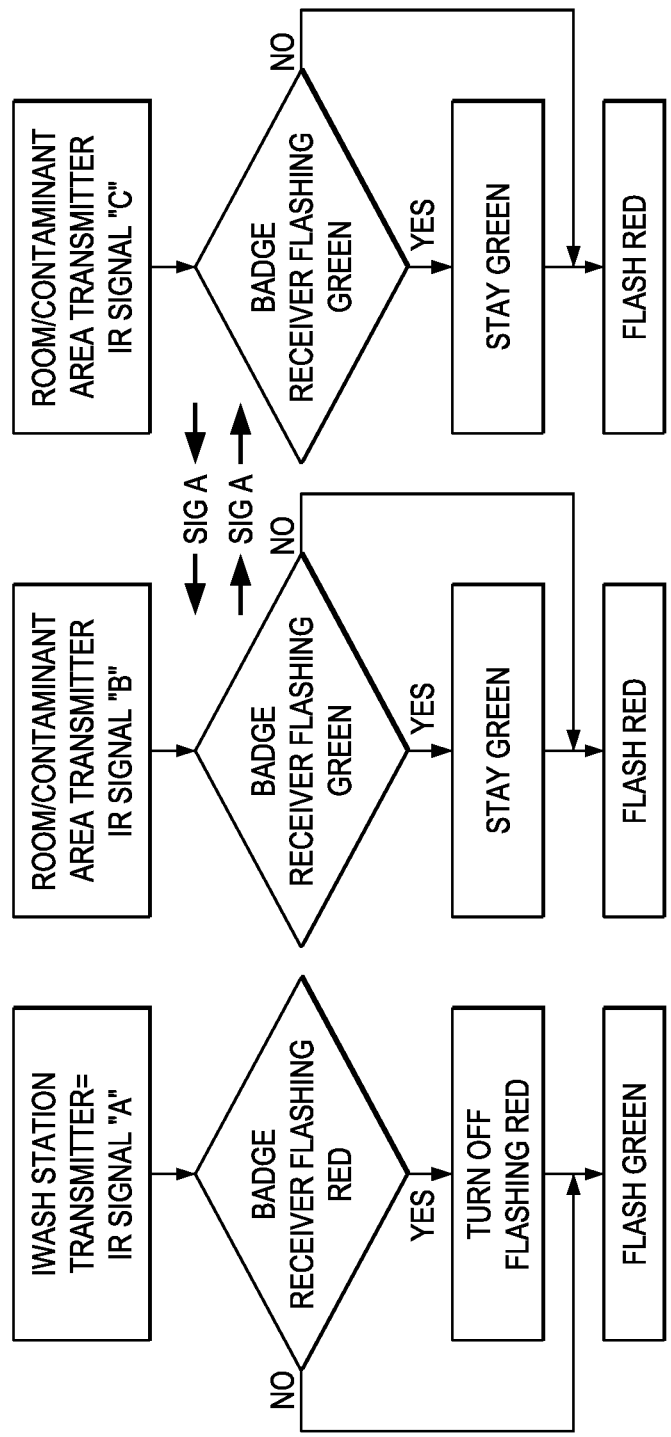
FIG. 15 is a flow chart.

FIG. 14 shows a schematic diagram for the receiver unit (e.g., receiver 52) using a PIC MCU designed to receive burst signals or ASCII signals which are interpreted to be either a signal "A" or a signal "B" and give a corresponding visual representation of said reception. The pinout shown is exemplary only. Various other circuit configurations or MCUs could be configured by one of skill in the art to achieve the functionality described in the present disclosure.

FIG. 4 shows strategic positioning of IWash transmitters, whereby the transmitters are located above a bed or in a corner of a contaminated area where said signals can span 180 degrees covering the room with an IR signature. The wash station transmitters can be placed directly below the wash station or to the side or above to send a signal based on movement or motion or even a push button version that can send only when a personnel pushes the said transmitter for an "A" signal to turn the receiver unit a flashing green and enter into Mode 1.

Wash stations may be located inside the contaminated areas. The wash station transmitters tell the badge to signal a flashing green signal. In one embodiment, the wash station transmitters can only transmit approximately 3 feet. The transmitters are preferably placed at 7 feet above the floor and approximately 2 feet above the wash station. This is because the transmitter transmits down towards the ground in a cone transmission with a beam divergence of 16 degrees. At 7 feet high, the divergent angle at the floor radius is 3 feet.

When a person walks down a hallway, i.e., a neutral area, he is not affected by the IR signature due to the fact the IR signal at the wash stations can only reach a 24 inch maximum radius to the floor. If the medical service personnel washes in the neutral areas where the wash station signal "A" turns the badge flashing green, there is no interference from the contaminated area "B" signal. Thus, "Foam In and Foam Out" procedures won't have a problem with signal confusion.

FIG. 6 shows a contaminated area. Some rooms have the wash station in the room, i.e., contaminated area, where the room transmitter may also be located. This situation has the potential to cause signal interference between the two transmitters. For best results, the room transmitters should be placed above the bed when possible and pointing perpendicular to the hallway to avoid transmitting signals from the room transmitters to the hallway or egress pathways. This prevents the badges from turning a flashing Red when medical personnel pass by each of the contaminated areas.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A method of biological and germ cross contamination control comprising the steps of:
    transmitting a first signal from a first transmitter proximate a wash station;
    receiving said first signal from said first transmitter with a receiver in a carried device;
    activating a first indicator in said carried device for indicating that a wearer has interfaced with said wash station
    transmitting an intermittent second signal from a second transmitter in a contaminated area;
    receiving said second signal from said second transmitter with a receiver in said carried device and starting a countdown timer from a time of receipt of said second signal;
    resetting said countdown timer to a maximum value upon a second receipt of said second signal;
    activating a second indicator in said carried device immediately upon expiration of said countdown timer for indicating a need to decontaminate; and
    wherein said carried device does not transmit a signal in response to said first signal and said second signal.

2. The method according to claim 1 further comprising:
    reporting a protocol breach if said second indicator is activated.

3. The method according to claim 1 wherein said first indicator is a green light.

4. The method according to claim 1 wherein said second indicator is a red light.

5. The method according to claim 1 wherein said first signal and said second signal is a pulsed IR signature whereby said pulsed signature is a unique signal identified with an IR receiver unit.

6. The method according to claim 5 wherein said pulsed IR signal is interpreted in ASCII format.

7. The method according to claim 6 wherein said pulsed IR signal is interpreted through ms pulse variable increments.

8. The method according to claim 1 wherein said step of transmitting in said contaminated area is by a second transmitter, wherein said second transmitter is powered by a power of Ethernet port.

9. The method according to claim 1 further comprising the step of:
    triggering a motion detector for activating said step of transmitting a first signal from a first transmitter proximate a wash station.

10. The method according to claim 1 wherein said step of transmitting a first signal from a first transmitter proximate a wash station comprises limiting a signal area for receiving said first signal to a limited area for inadvertent activation of carried devices near said first transmitter.

11. The method according to claim 10 wherein said limited area is approximately 0.5 meters or less.

12. The method according to claim 1 wherein said carried device is a badge.

13. The method according to claim 1 further comprising transmitting a third signal from a transmitter in a second contaminated area.

14. The method according to claim 13 further comprising:
    determining whether said first signal has been received after said step of receiving said second signal;
    if said third signal has been received after said step receiving said second signal, then activating a first indicator;
    if said third signal has not been received after said step of receiving said second signal, then activating said second indicator.

15. The method according to claim 1 wherein said step of activating said second indicator triggers a data upload to a database.

* * * * *